United States Patent Office

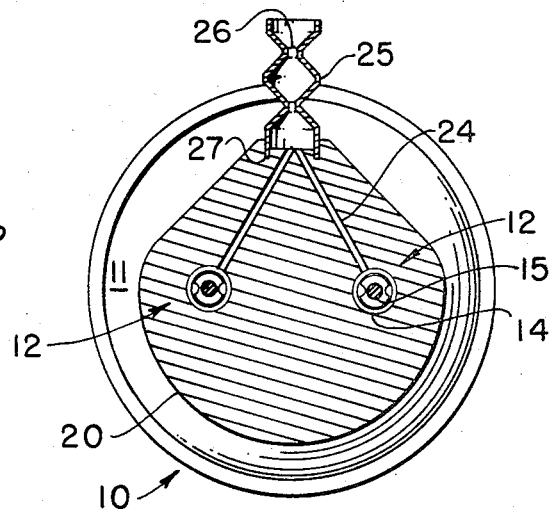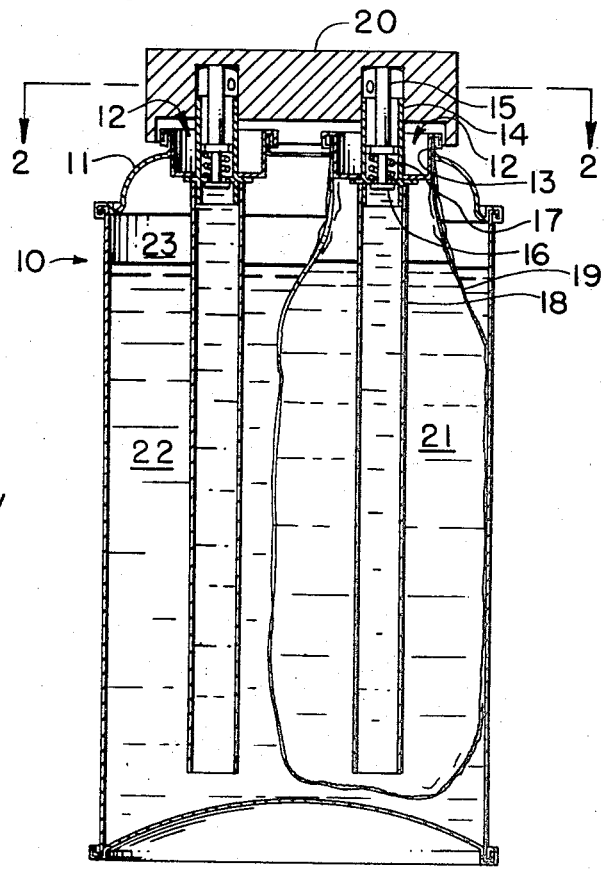

3,416,709
Patented Dec. 17, 1968

3,416,709
APPARATUS FOR APPLYING A PLURALITY OF FLUID MATERIALS
James H. Shultz and Clarence G. Zike, Indianapolis, Ind., assignors to Spray-Tak, Inc., Indianapolis, Ind., a corporation of Indiana
Filed Apr. 11, 1966, Ser. No. 541,585
6 Claims. (Cl. 222—94)

This invention relates to an improved method and apparatus for applying a plurality of fluid materials, and more particularly to a portable dispenser for applying such materials simultaneously in proportioned quantities.

Prior to our invention no acceptable method or apparatus existed for simultaneously dispensing proportionate quantities of fluid materials that combine in producing a desirable effect. Many examples of such combinations of fluid materials exist. Applying several foodstuffs in the correct proportions is, of course, important in obtaining a desirable taste and appearance.

A particularly useful application of my invention is with reactive multi-component chemical systems. Many chemical systems require the mixing of two or more components to achieve the desired properties of the chemical system. Such systems include adhesives, such as epoxies, and foamed plastics, such as polyurethane. In such systems it is important to maintain the relative proportions of the components within certain limits to achieve the desired properties of the mixture. Thus, with epoxy adhesives if too little hardener is mixed with the epoxide resin, the adhesive will not cure and the resultant bond will be impaired. If too much hardener is mixed with the epoxide resin, the mixture will cure too rapidly to permit alignment and joining of the elements being bonded together. With foamed plastics inadequate control of the proportions of the foaming agent and the plastic resin will result in a cellular structure which is not wanted. Similar problems are encountered with other multi-component chemical systems where inadequate control of the relative proportions of the constituents will result in an incomplete or defective reaction.

In the past chemically reactive two-component systems, such as epoxy adhesives, have been packaged in pre-measured quantities in small plastic bags having a frangible seal to isolate the component. When a quantity of materials is needed, the frangible seal is broken, and the bag is kneaded to mix the components together. Upon the completion of mixing, the bag is opened and the mixture is squeezed from the bag. This method of packaging such systems is frequently wasteful because of the requirement of preparing a premeasured quantity of the chemicals.

Where small amounts of such multi-components systems have been needed prior to our invention, it has been generally necessary to weigh-measure the components and mix them by hand. In addition to being time consuming and untidy, this method was wasteful because of the difficulty of estimating the quantity of material needed; where the mixture is reactive, such as a catalyzed epoxy, it was frequently more expedient to mix a quantity known to be in excess of that required rather than risk preparing too little material. The short pot life of many of these reactive materials prevented use of the excess material. Also, in many cases a weighing device is not available at the place where such multi-component systems are to be applied. Few householders, for example, have a weighing device which will permit proper proportioning of the components in small quantities, and estimating proportions by eye is difficult and risks a failure in achieving the desired characteristics of the chemical system.

In accordance with my invention we have found that we can conveniently apply measured quantities of multi-component fluid systems by placing the system components in a rigid portable container while keeping them isolated one from the others. After sealing the container, we pressurize it and subject each of the component materials to substantially equal pressure within the container. When the material is needed, we release selected quantities from the container, controlling the relative rates of escape of components by means in the flow path of each component, and direct the flow of the components to mix them.

This method can be practiced conveniently by using a novel dispenser containing the components. The fluid components are isolated within the dispenser by means having at least part of its surface movable in response to a pressure differential to urge the components from the container. The dispenser container is rigid and is pressurized by a propellant within it. A plurality of valves are provided which communicate with the components and normally block their escape from the container. A common operator controls the release of the components from the container; upon actuation of the common operator the components are simultaneously expelled from the container by the pressure within it.

One of the features of our invention is that a plurality of fluid materials may be placed in a container and may be dispensed simultaneously at controlled proportionate rates from the container in a convenient manner.

Another feature of our invention is that the fluid materials being subject to a common pressure are dispensed in the correct proportions until the container is emptied.

Still another feature of our invention is that a mixture of the fluid materials may be dispensed in easily measured amounts without weighing.

A more particular feature of our invention is that a pre-mixed, chemically reactive, multi-component system may be applied without waste, without equipment other than a portable container, and without clogging the container.

Another particular feature of our invention is that several foodstuffs may be simultaneously dispensed from a container without contamination of the food by a propellant.

A further feature of our invention is a novel dispenser in which a plurarity of fluid materials are isolated by deformable means and are each subjected to a substantially equal pressure.

Another feature of our dispenser is that the fluid materials may be mixed upon expulsion without retaining any of the mixture within the dispenser.

A further feature of our dispenser is a disposable mixer for the fluid materials.

Still another feature of our dispenser is a plurality of flexible bag-like subcontainers to isolate the fluid materials from each other and to prevent their contamination by the propellant.

An additional feature of our dispenser is that the propellant may be prevented from escaping from the dispenser during its use.

Other features of our invention will be apparent from the description and the drawings of certain embodiments of our invention.

FIGURE 1 is a cross sectional view of an embodiment of our invention in which the fluid materials are viscous and in which the propellant may be mixed with one of the materials.

FIGURE 2 is a cross sectional view of the common valve operator along plane 2—2 of FIGURE 1.

Referring to FIGURE 1, the dispenser includes an outer container 10 which may be made of any material that will not burst when subjected to internal pressures in the order of 40 pounds per square inch. Such a container may be made of 26 gauge tinplate as commonly used for aerosol dispensers. The top member 11 of the outer container is adapted to receive two valves. Each valve 12 consists of a metal cup 13 having an outer valve member 14 sealed therein. An inner valve stem 15 has a portion 16 which is urged by spring 17 into sealing engagement with outer valve member 14. A tube 18 depends from the outer valve member 14 and extends to the bottom of container 10 when the valves are seated on top member 11. Within the container 10 is a subcontainer 19 in the form of a deformable bag made from a thin film which will prevent the migration of fluid materials placed within the container and isolate them one from others. The valves 12 are simultaneously opened by a common valve operator 20 which upon depression moves portion 16 of valve stem 15 out of sealing engagement with outer valve member 14.

To use this dispenser, one fluid material 21 is placed within such container bag 19. Valve 12 is placed in the open mouth of the bag and seated upon top member 11 so that the mouth of the bag is closed by the valve. The metal cup 13 of valve 12 is crimped to top member 11 with the thin film at the mouth of bag 19 there between, as by expanding the metal cup. Both container 10 and subcontainer 19 are thereby sealed to valve 12. Another fluid material 22 is then placed into container 10. The other valve is seated upon top member 11 and crimped to the top member to seal container 10. Of course, the relative amounts of the fluid material placed into the dispenser depends upon the proportionate rates at which they will be expelled and may be varied accordingly. Container 10 is then pressurized by forcing a measured quantity of a propellant through one of the valves. It is preferably, as shown in FIGURE 1, that the propellant 23, which may or may not be miscible with fluid material 22, not be placed in a subcontainer.

Such a dispenser may be used to mix and apply multi component chemical systems, such as an epoxy adhesive-hardener combination. For example, a fluid hardener 21 may be placed in bag 19, and a fluid epoxy resin 22 may be placed in container 10 along with a propellant 23 such as Freon®. Vaporization of the propellant will pressurize the container 10, and both the epoxy resin 22 and the hardener 21 will be subjected to this pressure. When a quantity of this epoxy is needed, common operator 20 is depressed and the epoxy resin 22 and the hardener 21 are urged from the dispenser by a common pressure at rates which may be controlled by the restriction to flow that is imposed by the flow path of each material. The rate of flow of each material may be substantially controlled by any portion of the flow path, as by a restrictive orifice in each valve, to dispense the materials in the proper proportions. As shown in FIGURE 1 each material will flow through tube 18 and the openings defined by valve stem 15 and outer valve member 14 to the common operator 20.

As shown in FIGURE 2, the epoxy resin and the hardener will flow through passageways 24 in common operator 20 to an orifice. The components may be discharged from common operator 20 through adjacent orifices or through a common opening so long as they are not mixed in the common operator 20. Such mixing would result in clogging of the common operator due to the hardened epoxy. Where mixing of the fluid materials prior to application is desirable, as with the epoxy resin-hardener example, a disposable mixer 25 may be provided. Such a mixer may be a tube detachable retained in an annular groove 27 in the common operator and which has been deformed to provide a series of elongated restrictions 26 alternately disposed at right angles with respect to each other to blend the materials expelled from the dispenser as they leave the common operator. Such mixers may be made inexpensively by corrugating a standard metal or plastic tubing and a plurality of them supplied with the dispenser to permit repeated applications of mixed fluid materials. Where propellant is placed with each fluid material, it would be possible to invert the dispenser and expel propellant through the passageways to clean them, but this would be wasteful of the propellant, would result in an accelerated decline of pressure within the dispenser, and would require a larger share of the container volume to be occupied with propellant.

With our invention, the correct proportions of the fluid materials will be dispensed until the container is empty. Each of the fluid materials will be subject to substantially equal pressures although the container pressure may decrease as time passes.

Selection of a propellant depends upon its compatibility with one of the fluid materials in the embodiment shown in FIGURE 1. Examples of suitable propellants are Freon 12, propane and methyl bromide, although any material may be used which has a vapor pressure at room temperature high enough to expel the fluid materials and low enough to permit a lightweight container structure. By using a plurality of such containers as hereinafter described, it is possible to isolate the propellant from the fluid materials and alleviate the problem of propellant selection.

Where the deformable means to isolate the fluid materials in the dispenser is a bag-like sub container, it is desirable to use a thin flexible film. Nylon, polyethylene, polypropylene, and polyimide films are suitable for use in making the deformable means, as is aluminum foil. Care must be taken to insure that fluid material or propellant do not migrate through the plastic film where isolation must be complete. Laminated films are sometimes necessary to prevent the cross migration of the propellant and the fluid materials. Examples of such laminated films are polyethylene coated nylon and polyethylene coated aluminum foil. The thickness of the film used depends upon its flexibility. With nylon or polyimide films, the thickness should be about 1 to 2 mils; however, with polyethylene the thickness may be as great as 10 mils.

Of course, each of the fluid materials may be placed in a separate bag-like subcontainer, and the propellant may be placed in the container but outside of the bag-like subcontainers to prevent the escape of propellant which may occur if the propellant is mixed with one of the fluid materials. The pressure in the dispenser is thus maintained until the dispenser is emptied. Where the propellant may be mixed with the fluid materials, a quantity of propellant may be added to each bag-like sub-container.

Whenever we refer to deformable means isolating the fluid materials, we mean any barrier to fluid flow having at least a portion of its surface movable under the influence of a pressure differential. Such deformable means may be a flexible bag made of a thin film as in the described embodiments of our invention. Another example of such deformable means is a rigid can in the form of a cylinder with a movable piston-like bottom surface. Two such deformable means may be filled with fluid materials and sealed into a common rigid container having the propellant therein. Both fluid materials will be subject to the propellant pressure acting on the movable bottom surfaces of the deformable means. The flow of each material may be controlled by a separate valve and both may be actuated by a common operator to dispense the materials simultaneously at proportionate rates. Such a dispenser will permit mixing of the fluid materials with the same advantages noted for described embodiments.

The described embodiments of our invention are intended to be illustration of preferred forms of our invention which may be embodied in other specific forms without departing from the scope of the invention as defined in the claims.

We claim:

1. A portable dispenser for a plurality of fluid materials comprising, a sealed rigid container, a first fluid material within said container, a second fluid material within said container, deformable means within said container isolating said materials, first valve means sealed with said container and in comunication with said first material, second valve means sealed with said container and in communication with said second material, a propellant within said container to pressurize said container, and a common operator to actuate said valves whereby said materials are expelled from said container by the pressure, said common operator including passageways leading from said first and second valves to a disposable mixer.

2. A portable dispenser as set forth in claim 1 wherein said disposable mixer is a tube detachably retained on the common operator and formed to mix the materials upon ejection from the common operator.

3. A portable dispenser as set forth in claim 2 wherein said tube includes a series of elongated restrictions.

4. A portable dispenser as set forth in claim 1 wherein said disposable mixer is detachably retained to said common operator.

5. A portable dispenser as set forth in claim 4 wherein said common operator includes an annular groove, said passageways discharge at said annular groove, and said mixer is a tube retained in said annular groove.

6. A portable dispenser as set form in claim 5 wherein said elongated restrictions are alternately disposed at right angles with respect to each other.

References Cited

UNITED STATES PATENTS

| 2,941,696 | 6/1960 | Homm | 222—136 |
| 2,947,449 | 8/1960 | Hernandez | 222—94 |
| 2,973,883 | 3/1961 | Modderno | 222—94 |

FOREIGN PATENTS 1,040,430  10/1958  Germany.

ROBERT B. REEVES, *Primary Examiner.*

HADD S. LANE, *Assistant Examiner.*

U.S. Cl. X.R.

222—145; 239—306